United States Patent
Wu et al.

(10) Patent No.: US 7,352,590 B2
(45) Date of Patent: Apr. 1, 2008

(54) EJECT-LEVER APPARATUS FOR OPTICAL TRANSCEIVER

(75) Inventors: Zong-Yuan Wu, Miaoli (TW);
Wen-Shan Lin, Fengshan (TW);
Chia-Ping Wei, Yongkang (TW);
Jiun-Shian Yu, Kaohsiung (TW);
Jin-Sheng Chang, Tainan (TW);
Jung-Tai Chen, Fengshan (TW)

(73) Assignee: Industrial Technology Research Institute, Hsinchu (TW)

( * ) Notice: Subject to any disclaimer, the term of this patent is extended or adjusted under 35 U.S.C. 154(b) by 262 days.

(21) Appl. No.: 11/081,496

(22) Filed: Mar. 17, 2005

(65) Prior Publication Data

US 2006/0146506 A1     Jul. 6, 2006

(30) Foreign Application Priority Data

Dec. 31, 2004  (TW) .............................. 93141670 A (51) Int. Cl.
*H05K 5/00* (2006.01)
(52) U.S. Cl. ................... 361/754; 361/727; 361/756
(58) Field of Classification Search ................ 361/754, 361/727, 756, 801
See application file for complete search history.

(56) References Cited

U.S. PATENT DOCUMENTS 6,364,709 B1   4/2002   Jones .................... 439/607
6,434,015 B1   8/2002   Hwang .................... 361/754
2003/0198025 A1*  10/2003  Cao ........................ 361/728
2006/0067063 A1*  3/2006  Stahl et al. ............. 361/754

FOREIGN PATENT DOCUMENTS

WO    WO 03/098750    11/2003

* cited by examiner

*Primary Examiner*—Tuan T. Dinh
*Assistant Examiner*—Yuriy Semenenko
(74) *Attorney, Agent, or Firm*—Troxell Law Office, PLLC (57) ABSTRACT

The eject-lever apparatus of the present invention is arranged in an optical transceiver having a substrate, where the optical transceiver is being received in a housing having a slot arranged therein with the substrate being plugged into the slot, the apparatus comprising: at least a lever having a cam arranged therein, being disposed at the receiving end of the optic fiber of the optical transceiver; and at least a linkage rod, being deposed on a side of the optical transceiver, wherein the lever is actuated to rotate about an axis from a first location thereof to a second position thereof by exerting a force thereon while driving the cam to rotate accordingly for transmitting the force to an end of the linkage rod enabling the linkage rod to exert a force on the housing so as to generate a reacting force acting on the lever and thus cause the optical transceiver to move out to compress an elastic body and be ejected from the slot gradually; finally, the substrate is totally released from the slot for freeing the optical transceiver from the housing while the lever is in the second position, and thereafter, a resilience force generated by the compressed elastic body enables the returning of the lever from the second position to the first position while the lever is lightly moved.

18 Claims, 6 Drawing Sheets

EJECT-LEVER APPARATUS FOR OPTICAL TRANSCEIVER

FIELD OF THE INVENTION

The present invention relates to an eject-lever apparatus for an optical transceiver, and more particularly, to an eject-lever apparatus capable of ejecting an optical transceiver out a housing by using a mechanism of lever and linkage rod to force the substrate of the optical transceiver to disengage from a receptacle of the housing.

BACKGROUND OF THE INVENTION

By way of review, an optical transceiver is an integrated fiber optic component including an optical transmitter and an optical receiver, which is capable of providing bi-directional transmission of data between an electrical interface and an optical data link. The optical transceiver receives and converts electrically encoded data signals into optical signals which are then transmitted over the optical data link. Likewise, the optical transceiver receives and converts optically encoded data signals into electrical signals and transmits the electrical signals in the electrical interface. Nowadays, for the requirement of handling data transmission in massive volume, miniaturization of this optical transceiver is desirable in order to maximize the available number of optical transceivers per area of a circuit board. Various standards are known that define form factors for miniaturized electronic devices, such as the Small Form-Factor Pluggable (SFP) standard that is the one most widely adopted and specifies an enclosure 9.8 millimeters in height by 13.5 millimeters in width and having a minimum of 20 electrical input/output connections.

Because the application of SFP enabling a plurality of optical transceivers to be consisted in a module which are hot-swappable and thus can be easily interchanged, not only the efficiency of data transmission is increased, but also electro-optical or fiber optic networks can be upgraded and maintained more conveniently than has been the case with traditional soldered-in optical transceivers. Rather than replacing an entire circuit board containing several soldered-in optical transceivers, a single SFP transceiver can be removed and replaced for repair or upgrading. This can result in a substantial cost savings, both in maintenance and in upgrading efforts.

Since it is desire to arranged a plurality of miniaturized optical transceivers in a module, it is necessary to consider how to properly configure the plural transceivers and what is the appropriate means for releasing the transceivers from the module as well. A poor configuration or poorly designed releasing means not only may worsen the manufacturing cost, but also can cause a certain maintenance difficulties, and more particularly, the poorly designed releasing means might cause the damage of the optical transceiver or the optical fiber connected thereto during an releasing process and thus affect the performance and life span of the optical transceivers.

As disclosed in the U.S. Pat. No. 6,364,709, entitled "Small Form-Factor Pluggable Transceiver Cage", the pluggable cage uses a plurality spring tabs and a latch hole to hold the optical transceiver, and further utilizes the resilience force provided by bulge patches formed at the bottom of the cage for ejecting the optical transceiver while the same is disengaged from the plural spring tabs and the latch hole. Moreover, a cage structure similar to that of the U.S. Pat. No. 6,364,709 is disclosed in WO 03/098750 A1, entitled "Wire Lever Actuator Mechanism For Optical Transceiver".

In addition, U.S. Pat. No. 6,434,015, entitled "Small Form-Factor Pluggable Module Having Release Device", shows a cage for retaining a SFP module. The cage uses a spring tab formed at the frond end of the bottom of the cage to clasp to a triangular latch formed at the front of the SFP module such that the SFP module is fixed while a spring means arranged at the back panel of the cage is being compressed. Therefore, while releasing the SFP module, a push bar arranged at the front of the SFP module is pushed to release the triangular latch from the spring tab so that the resilience force of the compressed spring means can eject the SFP module.

From the above description, it is noted that most of the convention release devices for optical transceiver have shortcomings list as following:

(1) The ejection function performed by the spring means of the release device may fail due to elastic fatigue of the spring member, since the spring means may be compressed for a long period of time before releasing.
(2) The spring tab might block the way for obstructing the installation of the optical transceiver while the triangular latch is damaged or not functioning properly.
(3) The cracks of the spring tabs due to a finishing process might cause electromagnetic interference.
(4) A sufficient space is required at the back of the cage for allowing the disposition of the spring means.

According, there is a need for an eject-lever apparatus for an optical transceiver capable of solving the abovementioned shortcomings.

SUMMARY OF THE INVENTION

It is the primary object of the invention to provide an eject-lever apparatus for an optical transceiver, capable of enabling the disengagement of the optical transceiver from a slot of a housing by using an reacting force provided by a linkage mechanism of the eject-lever apparatus and thus enduring the wear of time.

It is another object of the invention to provide an eject-lever apparatus for an optical transceiver, capable of using a linkage mechanism thereof to exert a force onto either the back or the front of the body of the optical transceiver for disengaging the same from a slot of a housing.

It is yet another object of the invention to provide an eject-lever apparatus for an optical transceiver, capable of using a linkage mechanism thereof to disengage the optical transceiver from a slot of a housing while minimizing the use of spring tabs and maximizing shielding effect.

To achieve the above objects, the present invention provides an eject-lever apparatus, arranged in an optical transceiver having a substrate, where the optical transceiver is received in a housing having a slot arranged therein while the substrate is plugged in the slot, the eject-lever apparatus comprising: at least a lever having a cam arranged therein, being disposed at the receiving end of the optic fiber of the optical transceiver; and at least a linkage mechanism, being deposed on a side of the optical transceiver; wherein the lever is actuated to rotate about an axis from a first location thereof to a second position thereof by exerting a force thereon while driving the cam to rotate accordingly for transmitting the force to an end of the linkage rod enabling the linkage rod to exert a force on the housing so as to generate a reacting force acting on the lever and thus cause the optical transceiver to move out to compress an elastic body and be ejected from the slot gradually; finally, the substrate is totally released from the slot for freeing the optical transceiver from the housing while the lever is in the second position, and thereafter, a resilience force generated by the compressed elastic body enables the returning of the lever from the second position to the first position while the lever is lightly moved to escape the contacting position with the linkage rod.

Other objects, advantages and novel features of the invention will become more apparent from the following detailed description when taken in conjunction with the accompanying drawings, in which:

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1A:
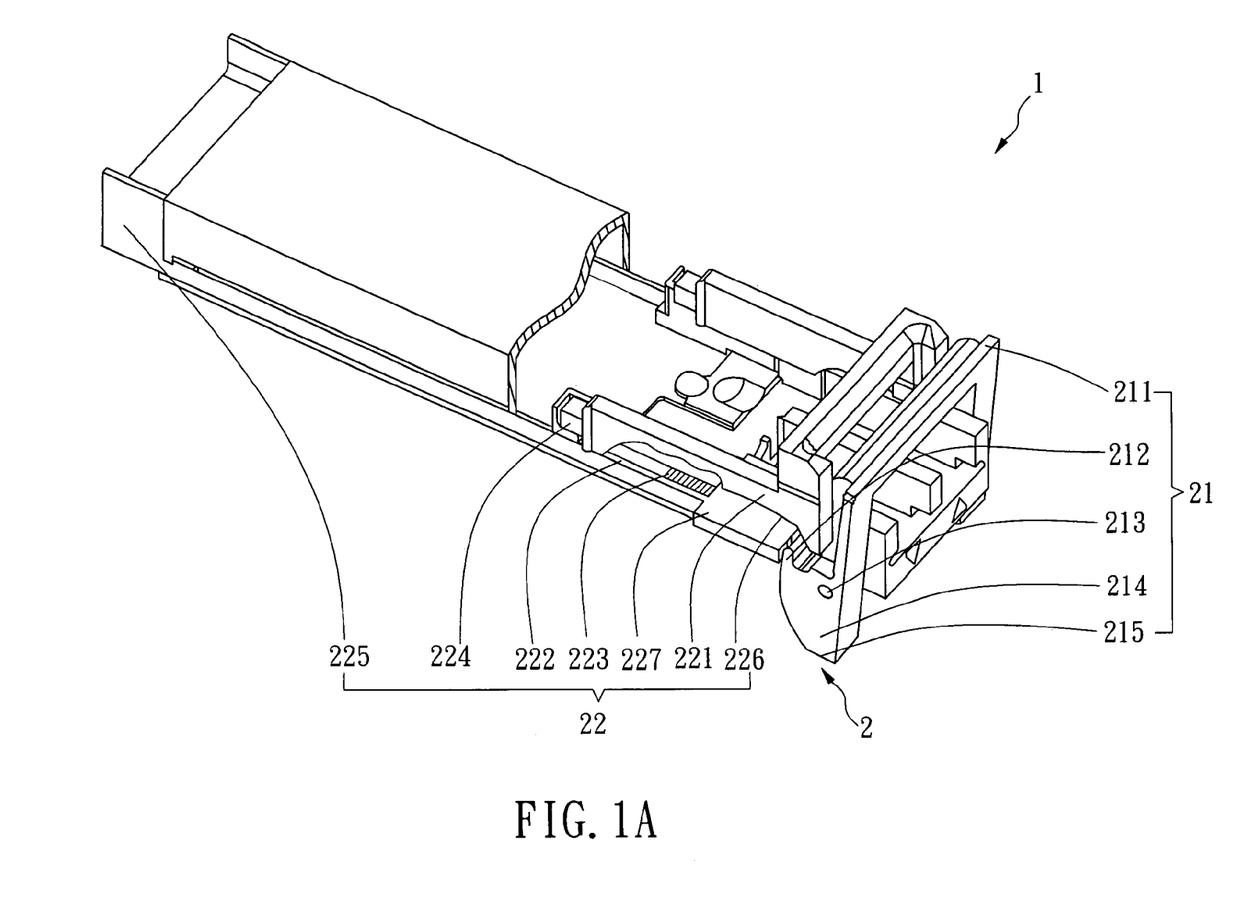
FIG. 1A is a schematic view of an eject-lever apparatus for an optical transceiver according to a preferred embodiment of the invention.

Please refer to FIG. 1A, which is a schematic view of an eject-lever apparatus for an optical transceiver according to a preferred embodiment of the invention. In FIG. 1A, an eject-lever apparatus 2 is attached to an optical transceiver 1 and is composed of a lever unit 21 and a pair of eject units 22, disposed at the two sides of the optical transceiver 1 in respective.

The lever unit 21 further comprises a lever 211, a pair of cams 214, a pair of axes 213, and a pair of hook-like parts 212. Wherein, the lever 211 is disposed over the optical transceiver 1 while the cams 214, the axes 213 and the hook-like part 212 are disposed at the two frontal sides of the optical transceiver 1 in respective with each cam 214 being arranged underneath its corresponding axis 213 and each hook-like part 212 being arranged at a side of its corresponding axis 213. Moreover, a lateral profile of the cam 214 is defined by a function while the tip of the cam 214 is a plat area 215. The lever unit 21 can be made of a metal, such as iron, magnesium alloy, and aluminum alloy, etc., or can be made of a polymer, such as plastic, and so on.

Figure 1B:
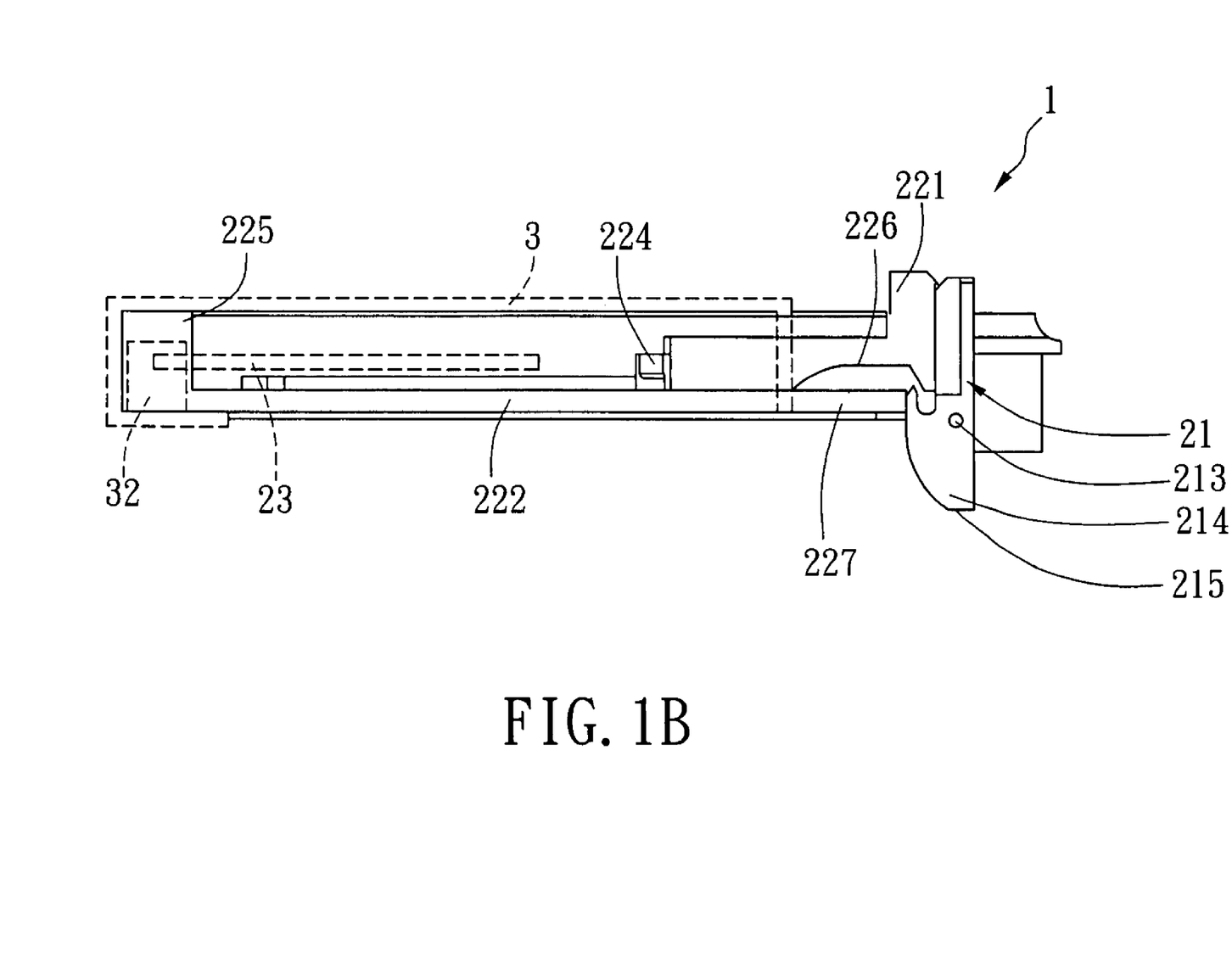
FIG. 1B a side view of a eject-lever apparatus being received in a housing according to a preferred embodiment of the invention.

The two eject unit 22 are symmetrically disposed at the two side of the optical transceiver 1 in respective, which comprises a release part 221, a linkage mechanism 222 and an elastic body 223. The release part 221, further comprising a groove 226 and a bulge 224, is arranged proximate to it corresponding side of the optical transceiver 1 while the linkage mechanism 222 having the pushing block 225 and 227 are place at a side of the release part 221. The linkage mechanism 222 can be made of a metal, such as iron, magnesium alloy, and aluminum alloy, etc., or can be made of a polymer, such as plastic, and so on. Please refer to FIG. 1B, which a side view of a eject-lever apparatus being received in a housing according to a preferred embodiment of the invention. As seen in FIG. 1B, the pushing block 225 is abutted against the bottom of a housing 3 while the other pushing block 227 is abutted against the frontal end of the housing 3 such that the linkage mechanism can transmit a force exerting thereon to the housing 3 and thus enable the housing to generate and exert a reacting force on the lever unit 21 so as to push out the optical transceiver 1. In a preferred embodiment of the invention, either only abutting the pushing block 225 against the bottom of a housing 3, or only abutting the pushing block 227 against the frontal end of the housing 3 is selectively adapted by the linkage mechanism 222 for achieving the disengaging of the optical transceiver 1.

Figure 2A:
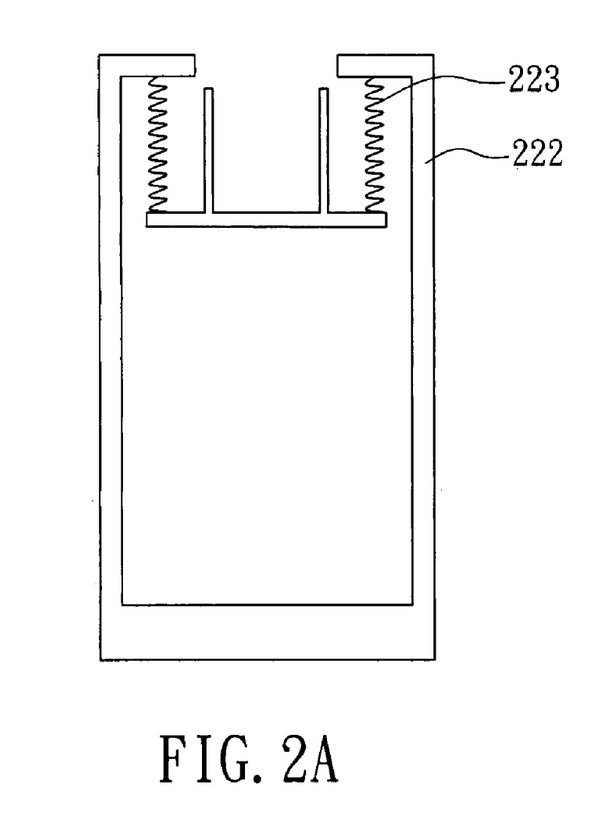
FIG. 2A is a schematic side view illustrating an elastic body coupled to a linkage mechanism accord to a preferred embodiment of the invention.
Figure 2B:
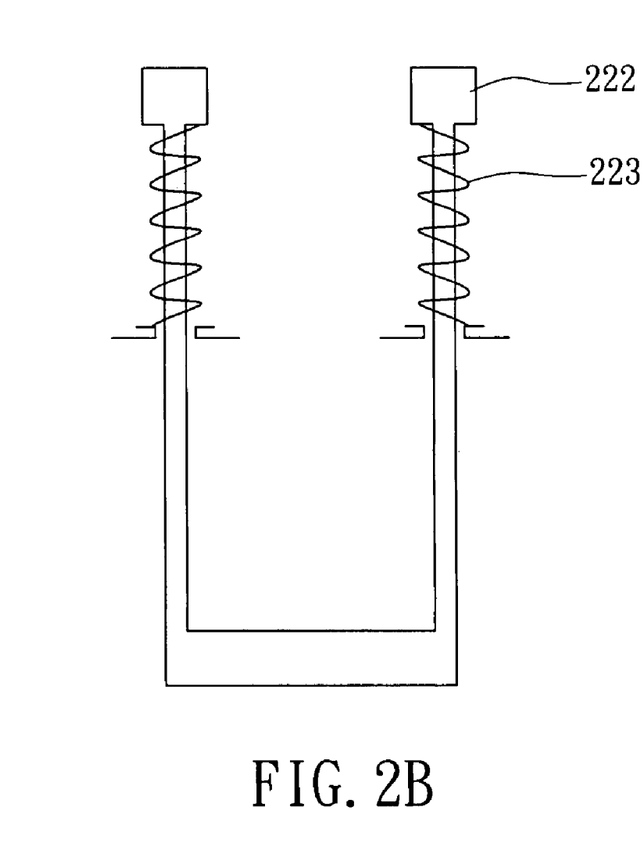
FIG. 2B is a schematic side view illustrating an elastic body coupled to a linkage mechanism accord to another preferred embodiment of the invention.

Please refer to FIG. 2A, which is a schematic side view illustrating an elastic body coupled to a linkage mechanism accord to a preferred embodiment of the invention. In FIG. 2A, the elastic body 223 is placed at a side of the linkage mechanism 222 while connecting an end of the elastic body 223 to the linkage mechanism 222 and another end of the elastic body 223 to the optical transceiver 1. In addition, as seen in another embodiment seen in FIG. 2B, the elastic body 223 is installed on the linkage mechanism 222 while connecting an end of the elastic body 223 to an end of the linkage mechanism 222 and another end of the elastic body 223 to the optical transceiver 1. The elastic body 223 is a resilient means, such as a spring or a rubber, etc.

Figure 3A:
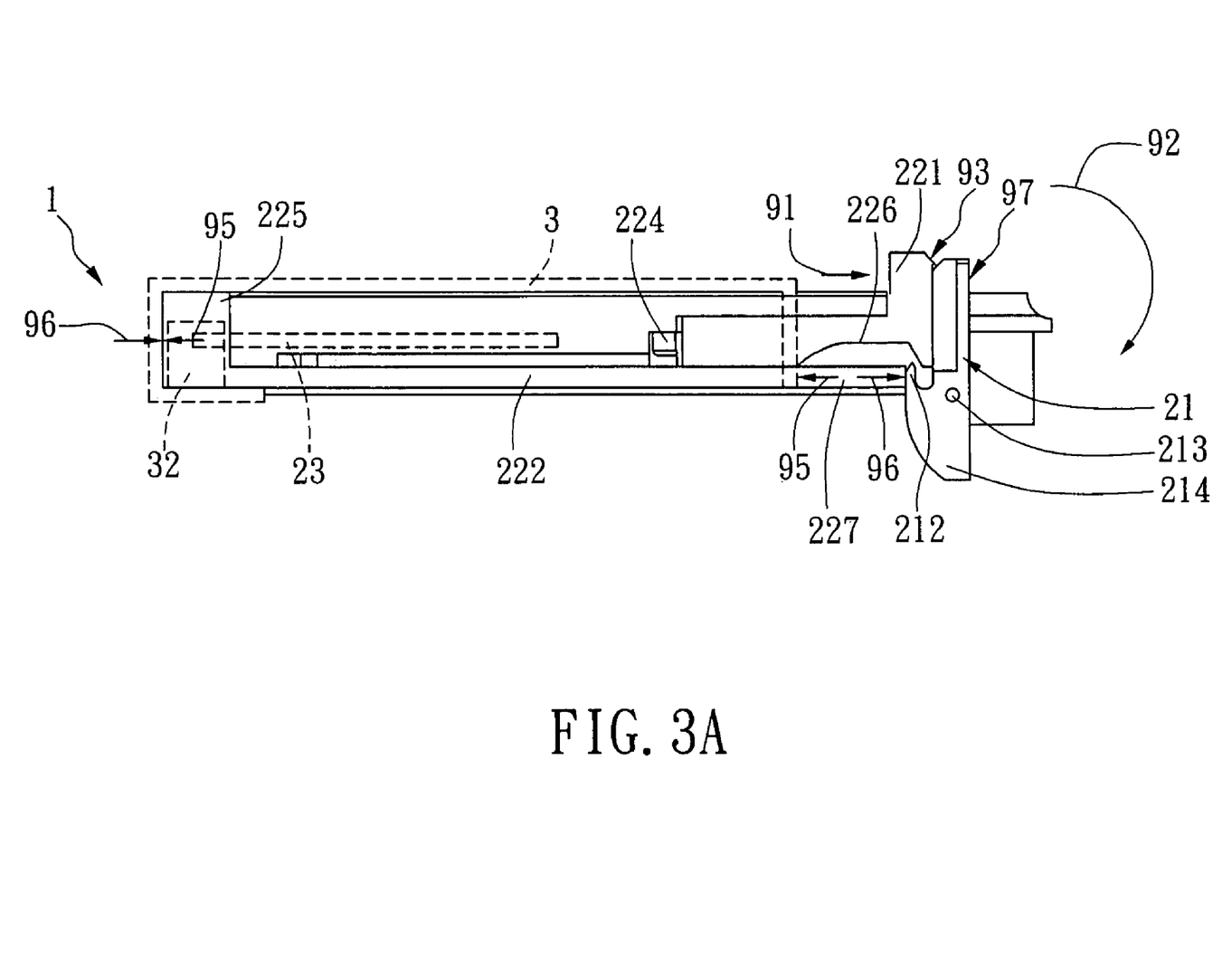
FIG. 3A is a side view of an eject-lever apparatus while the lever thereof is at a first position accord to a preferred embodiment of the invention.
Figure 4A:
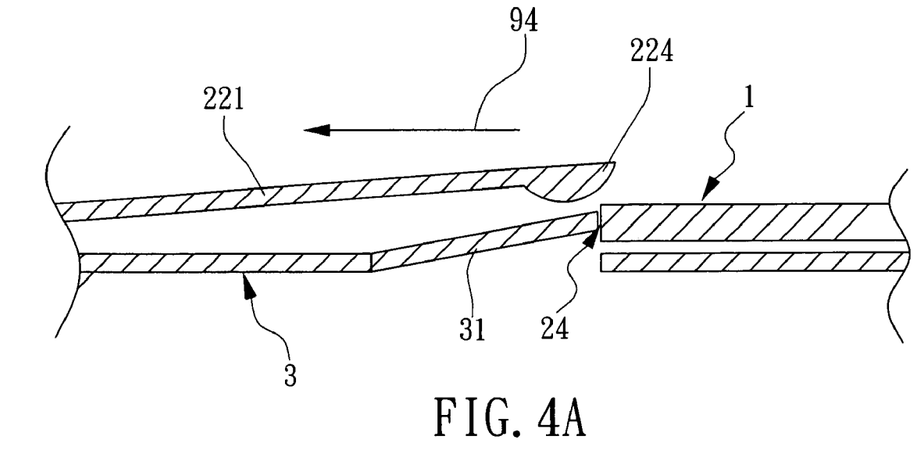
FIG. 4A is a schematic diagram showing that the house of the invention used a spring tab thereof to hold and fix the optical transceiver.
Figure 4B:
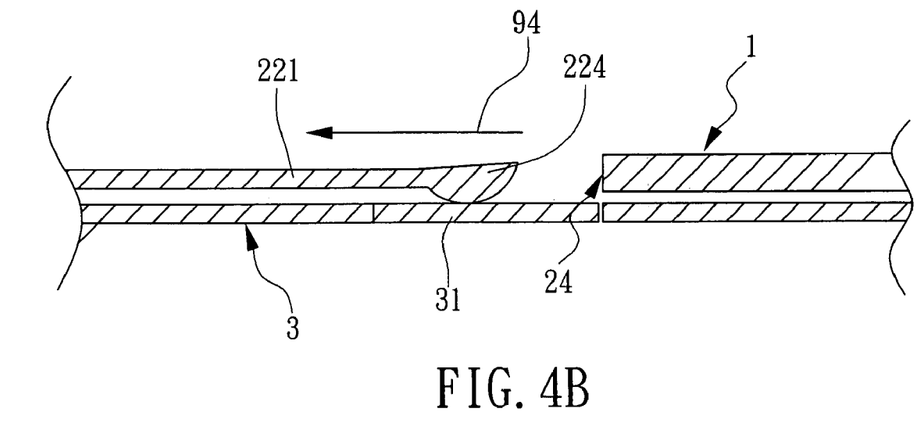
FIG. 4B is a schematic diagram showing the spring tab being released by a bulge.

As seen in FIG. 3A and FIG. 4A, the optical transceiver 1 with a substrate 23 is received in a housing 3 by plugging the back portion of the substrate 23 into a slot 32 of the housing 3, and further, the optical transceiver 1 is hold and fixed in the housing 3 by insetting at least a spring tab 31 formed on the housing 3 into a recess 24 formed on a lateral side of the optical transceiver 1. In FIG. 3A, as a force is exerted on the lever unit 21 which is initially located at a first position 97, the lever unit 21 is driven to rotate about the axis 213 following a rotating movement defined by the arrow 92 such that the hook-like part 212 will move accordingly and push the wall of the groove 226 enabling the release part 221 to move toward the receiving end of an optical fiber following a sliding movement defined by the arrow 94 of FIG. 4A. As the release part 221 is proceeding with the sliding movement 94, the bulge 224 of the release part 221 will come into contact with the spring tab 31 such that the spring tab is pressed and disengaged from the recess 24 of the optical transceiver 1 enabling the optical transceiver 1 to be released, which is shown in FIG. 4B.

As soon as the release part 221 enables the optical transceiver 1 to be released and following the rotating movement 92 of the lever unit 92, the outer rim of the cam 214 will come into contact with and exerting an acting force 95 on an end of the linkage mechanism 222 while the acting force is being transmitted to the housing 3 by the two pushing blocks 225 and 227, such that a reacting force 96 is generated and being transmitted to the axis 213 of the lever unit 21 by the linkage mechanism enabling the optical transceiver 1 to leave an initial location 93 thereof following a displacement defined by the arrow 91. As the optical transceiver 1 is moving and gradually disengaging the substrate 23 from the slot 32, the elastic body 213 is being compressed by the optical transceiver 1 while building up a resilience force (not shown).

Figure 3B:
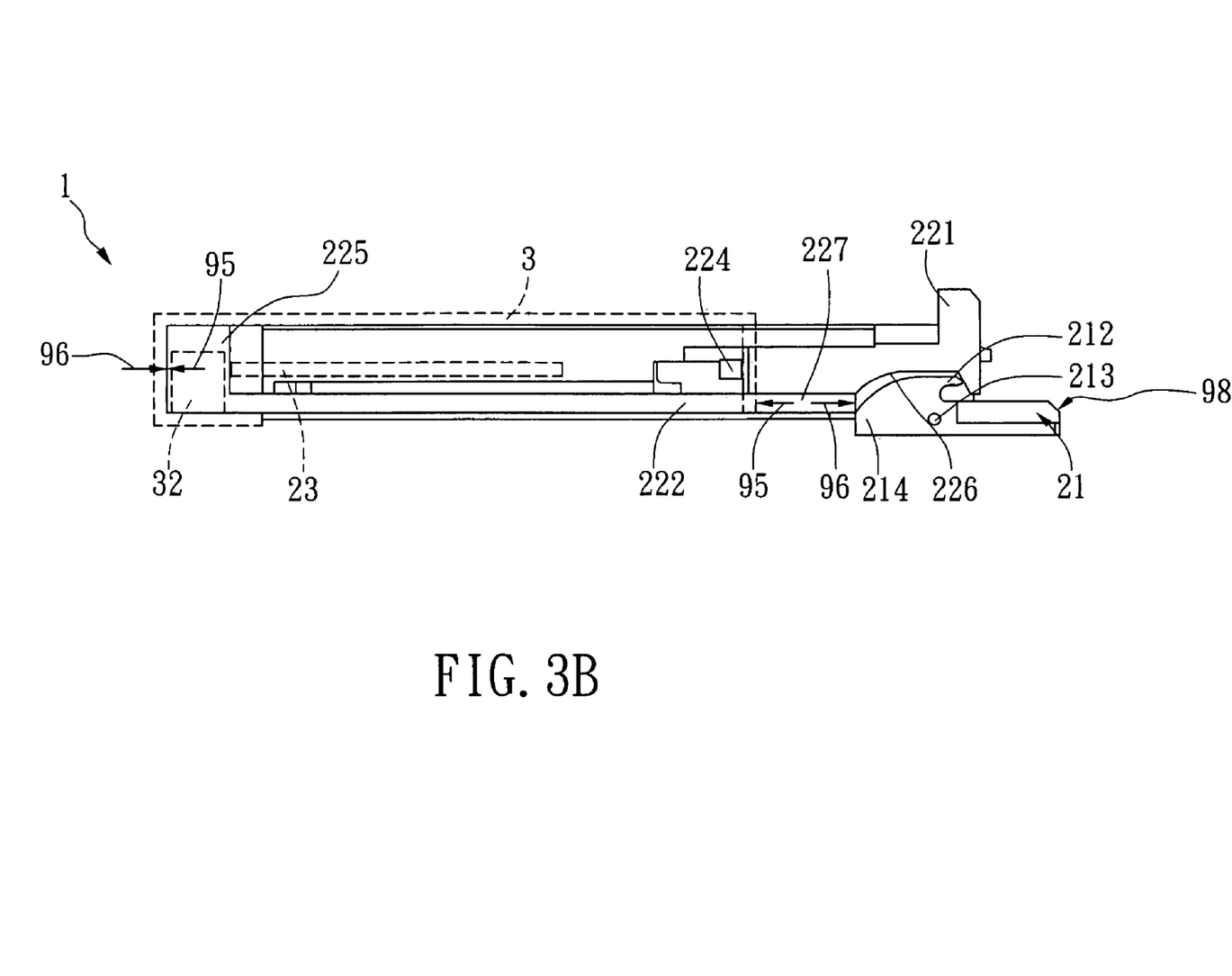
FIG. 3B is a side view of an eject-lever apparatus while the lever thereof is at a second position accord to a preferred embodiment of the invention.

As the lever unit 21 is rotated to a second position 98 shown in FIG. 3B, the flat area 215 of the cam 214 abuts the front end of the linkage mechanism 222 which stop the rotating movement 92 and the substrate 23 is completely disengaged from the slot 32 while the optical transceiver 1 is free from the housing 3. Following, by reversely rotating the lever unit 21 from the second position 98 to the first position 97 only slightly, the resilience force generated by the compressed elastic body 223 will drive the lever unit 21 to rotate all the way back to the first position 97.

It is to be understood that the foregoing description is merely a disclosure of particular embodiments, where a housing with the spring tab can be adopted in an alternative embodiment of the invention, and in no way intended to limit the scope of the invention.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An eject-lever apparatus arranged in an optical transceiver having a substrate, where the optical transceiver is received in a housing having a slot arranged therein while the substrate is plugged in the slot, the eject-lever apparatus comprising:
    at least a lever having a cam arranged therein, being disposed at the receiving end of an optic fiber of the optical transceiver; and
    at least a linkage mechanism, being deposed on a side of the optical transceiver while having at least an end thereof abutted against the housing;
    wherein the lever is actuated to rotate about an axis by exerting a force thereon and enabling the cam arranged at a side of the axis to rotate accordingly for transmitting the force to the linkage mechanism, and when the lever is rotated, the linkage mechanism driving the optical transceiver to move and disengage from the slot and the housing,
    wherein the lever is actuated to rotate about an axis by exerting a force thereon while driving the cam to rotate accordingly for transmitting the force to the linkage mechanism enabling the end of the linkage mechanism abutted against the housing to exert a force on the housing so as to generate a reacting force acting on the optical transceiver to enable the substrate of the optical transceiver to disengage from the slot and eventually release the optical transceiver from the housing.

2. The apparatus of claim 1, further comprising:
    an elastic body arranged at a side of the linkage mechanism, capable of providing a resilience force to drive the lever back to an initial position after the lever being forced to rotate about the axis by connected an end thereof to the linkage mechanism and another end thereof to the optical transceiver.

3. The apparatus of claim 2, wherein the elastic body is selected from the group consisting of a spring and a rubber.

4. The apparatus of claim 1, further comprising:
    an elastic body being installed on the linkage mechanism, capable of providing a resilience force to drive the lever back to an initial position after the lever being forced to rotate about the axis by connected an end thereof to the linkage mechanism and another end thereof to the optical transceiver.

5. The apparatus of claim 4, wherein the elastic body is selected from the group consisting of a spring and a rubber.

6. The apparatus of claim 1, wherein the profile of the cam is defined by a surface function.

7. The apparatus of claim 1, wherein both the lever and the linkage mechanism is made of a metal.

8. The apparatus of claim 7, wherein the metal is selected from the group consisting of iron, magnesium alloy and aluminum alloy.

9. The apparatus of claim 1, wherein both the lever and the linkage mechanism is made of a plastic.

10. An eject-lever apparatus arranged in an optical transceiver having a substrate, where the optical transceiver is received in a housing having a slot arranged therein while the substrate is plugged in the slot, the eject-lever apparatus comprising:
    at least a lever having a cam arranged therein, being disposed at the receiving end of an optic fiber of the optical transceiver; and
    at least a linkage mechanism, being deposed on a side of the optical transceiver while having at least an end thereof abutted against the housing;
    wherein the lever is actuated to rotate about an axis by exerting a force thereon and enabling the cam arranged at a side of the axis to rotate accordingly for transmitting the force to the linkage mechanism, and when the lever is rotated, the linkage mechanism driving the optical transceiver to move and disengage from the slot and the housing,
    wherein an end of the linkage mechanism is abutted against a frontal side of the housing for enabling the linkage mechanism to exert a force on the frontal side of the housing so as to generate a reacting force acting on the optical transceiver to enable the substrate of the optical transceiver to disengage from the slot and eventually release the optical transceiver from the housing.

11. The apparatus of claim 10, further comprising:
    an elastic body arranged at a side of the linkage mechanism, capable of providing a resilience force to drive the lever back to an initial position after the lever being forced to rotate about the axis by connected an end thereof to the linkage mechanism and another end thereof to the optical transceiver.

12. The apparatus of claim 11, wherein the elastic body is selected from the group consisting of a spring and a rubber.

13. The apparatus of claim 10, further comprising:
    an elastic body being installed on the linkage mechanism, capable of providing a resilience force to drive the lever back to an initial position after the lever being forced to rotate about the axis by connected an end thereof to the linkage mechanism and another end thereof to the optical transceiver.

14. The apparatus of claim 13, wherein the elastic body is selected from the group consisting of a spring and a rubber.

15. The apparatus of claim 10, wherein the profile of the cam is defined by a surface function.

16. The apparatus of claim 10, wherein both the lever and the linkage mechanism is made of a metal.

17. The apparatus of claim 16, wherein the metal is selected from the group consisting of iron, magnesium alloy and aluminum alloy.

18. The apparatus of claim 10, wherein both the lever and the linkage mechanism is made of a plastic.

* * * * *